United States Patent [19]
Takahashi

[11] Patent Number: 4,869,335
[45] Date of Patent: Sep. 26, 1989

[54] FOUR-WHEEL STEERING SYSTEM OF A MOTOR VEHICLE

[75] Inventor: Akira Takahashi, Tokyo, Japan

[73] Assignee: Fuji Jukogyo Kabushiki Kaisha, Tokyo, Japan

[21] Appl. No.: 255,691

[22] Filed: Oct. 7, 1988

[30] Foreign Application Priority Data

Oct. 9, 1987 [JP] Japan .................................. 62-255288

[51] Int. Cl.$^4$ ........................... B62D 5/04; B62D 6/02
[52] U.S. Cl. .................................... 180/140; 180/79.1; 280/91
[58] Field of Search ...................... 180/140, 142, 79.1, 180/141; 280/91

[56] References Cited

U.S. PATENT DOCUMENTS 4,779,693 10/1988 Takahashi et al. ................ 280/91 X

FOREIGN PATENT DOCUMENTS

| 0243180 | 10/1987 | European Pat. Off. ............ 180/140 |
| 58-164477 | 9/1983 | Japan . |
| 60-183264 | 9/1985 | Japan . |
| 60-44185 | 10/1985 | Japan . |
| 62-187663 | 8/1987 | Japan . |

*Primary Examiner*—John A. Pekar
*Attorney, Agent, or Firm*—Martin A. Farber

[57] ABSTRACT

A system for steering rear wheels of a motor vehicle has a detector for detecting cornering force exerted on front wheels and a speed detector for detecting steering speed of a steering wheel of the vehicle. A desired rear-wheel steering angle is calculated based on the cornering force and vehicle speed, a desired rear-wheel steering speed is obtained from the steering speed and the vehicle speed. In response to the desired rear-wheel steering angle and to the desired rear-wheel steering speed, rear wheels are steered.

5 Claims, 9 Drawing Sheets

FOUR-WHEEL STEERING SYSTEM OF A MOTOR VEHICLE

BACKGROUND OF THE INVENTION

The present invention relates to a system for steering rear wheels of a motor vehicle.

A four-wheel steering system for steering rear wheels together with front wheels is known. Japanese Patent Publication No. 60-44185 discloses a rear wheels steering system where rear wheels are simultaneously steered in equiphase with the front wheels, thereby preventing response delay of the steering of the rear wheels.

Japanese Patent Laid-Open Nos. 58-164477 and 60-183264 disclose steering systems where steering of the rear wheels is delayed, in order to enhance the yawing, which is a movement of the vehicle to turn the direction thereof in accordance with the steering of the front wheels.

All of the above-mentioned systems are operated when a driver intentionally turns a steering wheel in order to go round a curve. Japanese Patent Laid-Open No. 62-187663 and EP No. 0243180 disclose steering systems, in which the swaying of a vehicle caused by a disturbing force such as wind is detected and the rear wheels are steered accordingly to steady the vehicle, although the steering wheel is at a neutral position for straight-ahead driving.

In the system, the sway of the vehicle caused by the disturbing force is detected as a cornering force exerted on the front wheels. However, a waveform of a detected signal dependent on the cornering force includes small fluctuations or discontinuities dependent on surface conditions of the road and frictions in the steering system. Thus, the steering of rear wheels cannot be smoothly controlled.

In order to smooth of the waveform of the signal, a low-pass filter is typically used to eliminate unnecessary components. However, the signal is attenuated by filtering. Accordingly, the steering angle of the rear wheels is extremely decreased. In addition, since the low-pass filter delays the signal in a high-frequency region, a high-frequency signal at quick steering is also delayed. Accordingly, the steering of the rear wheels is largely delayed when the steering wheel is quickly rotated.

SUMMARY OF THE INVENTION

The object of the present invention is to provide a steering system for rear wheels wherein the rear wheels are appropriately steered without an excessive delay.

According to the present invention, there is provided a steering system for a motor vehicle having a front-wheel steering system including a steering wheel comprising detector means for detecting force exerted on front wheels and for producing a force signal, speed detector means for detecting rotational speed of the steering wheel and for producing a steering speed signal, a vehicle speed sensor for producing a vehicle speed signal, steering angle detecting means for detecting rear-wheel steering angle and for producing a steering angle signal, calculator means responsive to the force signal and to the vehicle speed signal for producing a desired rear-wheel steering angle, calculator means responsive to the steering speed signal and to the vehicle speed signal for producing a desired rear-wheel steering speed signal, rear-wheel steering means responsive to the desired rear-wheel steering angle and to the desired rear-wheel steering speed signal for steering rear wheels.

In an aspect of the invention, the force exerted on the front wheels is a cornering force.

The other objects and features of this invention will become understood from the following description with reference to the accompanying drawings.

BRIEF DESCRIPTION OF DRAWINGS

FIGS. 3 and 4 are flowcharts showing filtering processes of a pressure difference signal and a steering speed signal, respectively;

DETAILED DESCRIPTION OF THE PREFERRED EMBODIMENT

Figure 2:
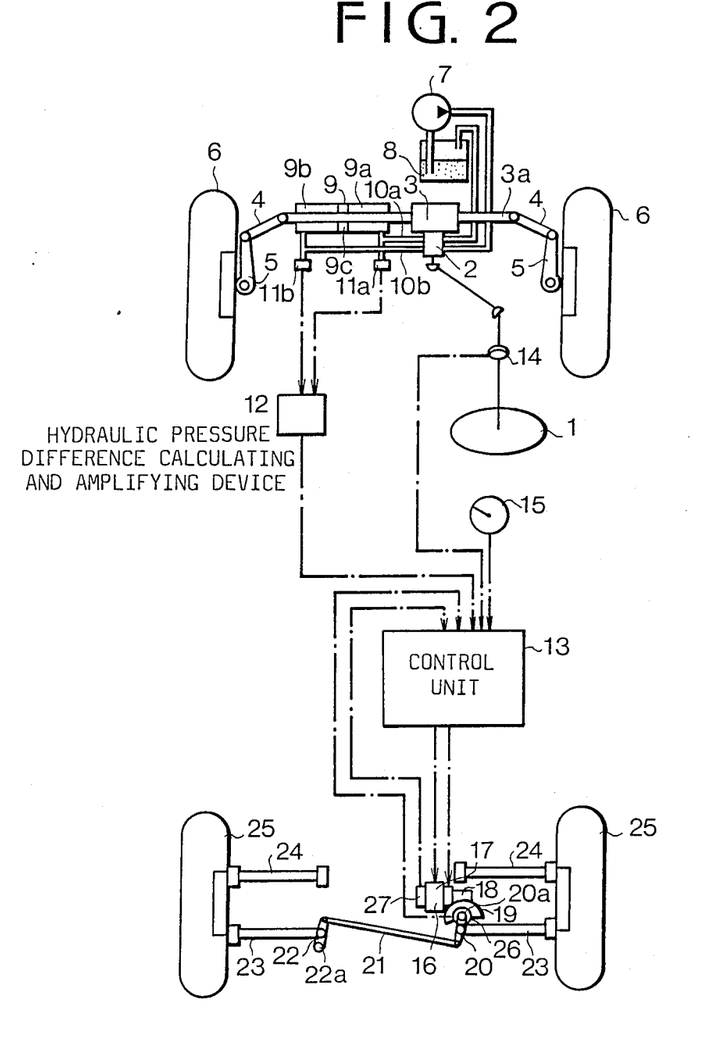
FIG. 2 is a schematic plan view of a first embodiment of the present invention.

Referring to FIG. 2, a hydraulic linkage-type power steering system to which the present invention is applied comprises a steering wheel 1, a gear box 3 having a rack bar 3a, a pair of tie rods 4 connected to both ends of the rack bar 3a, and a pair of knuckle arms 5 each connected to one of the tie rod 4 for a front wheel 6 of a motor vehicle. The rack bar 3a has a piston 9c in a hydraulic power cylinder 9. The hydraulic power cylinder has right and left oil chambers 9a and 9b which are respectively connected to a control valve 2 through oil pipes 10a and 10b. The control valve 2 is operated by the steering wheel 1 to selectively communicate the chambers 9a, 9b with a hydraulic pump 7 and an oil reservoir tank 8. When the steering wheel 1 is turned in one direction, the steering system and the control valve 2 are operated in dependence on the turning of the steering wheel. One of the chambers 9a and 9b of the hydraulic power cylinder 9 is supplied with oil from the pump 7, so that hydraulic assist force is generated in the steering direction so as to reduce a steering effort on the steering wheel.

Hydraulic pressure sensors 11a and 11b are provided for detecting the hydraulic pressures in the chambers 9a and 9b. Electric signals representing the pressures are fed to a hydraulic pressure difference calculating and amplifying device 12 which calculates an assist force from the pressure difference ΔP detected by the sensors 11a and 11b and applies a signal representing the assist force to a control unit 13.

The system is provided with a steering wheel angular velocity sensor 14 which detects steering direction and steering speed and applies an output signal to the control unit 13. A vehicle speed sensor 15 is provided for producing a vehicle speed signal which is applied to the control unit 13.

A rear-wheel steering system comprises a pair of front and rear lateral links 24 and 23, right and left levers 20 and 22, each pivotally connected to the rear lateral link 23 at a center, and a connecting rod 21 pivotally connected to one end of each lever 20 and 22. The other end of left lever 22 is pivotally mounted on a shaft 22a which is fixed to the body of the vehicle, and the other end of the right lever 20 is fixed to a rotary shaft 20a. Each of the front lateral links 24 is pivotally connected to an arm of rear wheel 25 at one end and secured to the body of the vehicle at the other end. Each of the rear lateral link 23 is pivotally connected to the arm of the rear wheel 25. A worm sector 19 is securely mounted on the shaft 20a and engaged with a worm 18 which is formed on an output shaft of a electromagnetic clutch 17. An electric motor 16 is provided for steering rear wheels 25. A rotary shaft of the motor is connected to an input shaft of the clutch 17. When the clutch is engaged in accordance with a signal from the control unit 13, the rotation of rotary shaft of the motor 16 is transmitted to the worm 18 and the worm sector 19. Accordingly, the right lever 20 is rotated together with the shaft 20a. Thus, the rear lateral links 23 are substantially laterally moved to steer the rear wheels 25.

An angle sensor 26 is provided on the shaft 20a for detecting an angular displacement thereof and a rotational speed sensor 27 is provided on the motor 16 for detecting the motor speed. Output signals of both sensors 26 and 27 are applied to the control unit 13.

Figure 3:
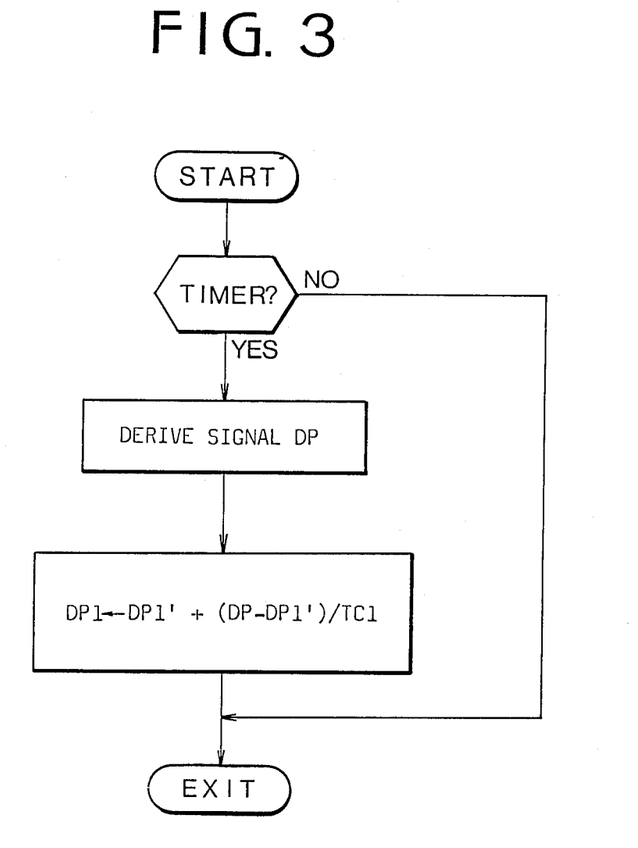

The operation of the control unit 13 is described hereinafter with reference to FIGS. 3 to 7. The pressure difference calculating and amplifying device 12 produces a pressure difference signal DP which represents the difference $\Delta P$ between pressures in the chambers 9a and 9b of the power cylinder 9. The signal DP is filtered in the control unit 13 as described hereinafter. Referring to FIG. 3, the signal DP is obtained at predetermined intervals, for example at every 4 ms, which is counted by a timer. A filtered value DP1 of the signal DP is calculated in dependence on the following equation.

$$DP1 = DP1' + (DP - DP1')/TC1$$

where DP1' is a filtered value calculated at the last program, and TC1 is a constant correlative to a time constant of a time-lag of first order. The filtering process corresponds to a time-lag of first order which is expressed as a transfer function represented by $1/(1+T(S))$ where T is a time constant expressed by TIMER (set time) $\times$ TC1. Accordingly, when TC1 is 32, the time constant T is calculated as 0.004 sec $\times$ 32 = 0.128 sec.

Figure 4:
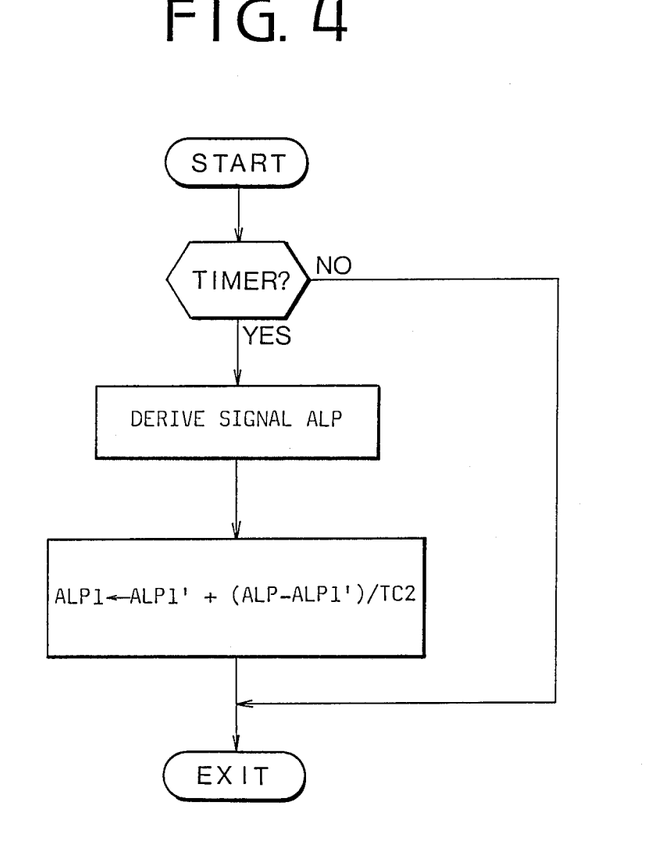

A steering angular velocity signal ALP representing the angular velocity $\alpha$ is also filtered, as shown by a flowchart in FIG. 4, in the same manner. Namely, filtered value ALP1 is obtained by the following equation.

$$ALP1 = ALP1' + (ALP - ALP1')/TC2$$

where ALP1' is a filtered value calculated at the last program and TC2 is a constant which is determined in consideration to the filtering process of the pressure difference signal DP and response delay characteristic inherent in the control system for the electric motor 16 so as to set an appropriate response delay in the steering system of the rear wheels.

Figure 5:
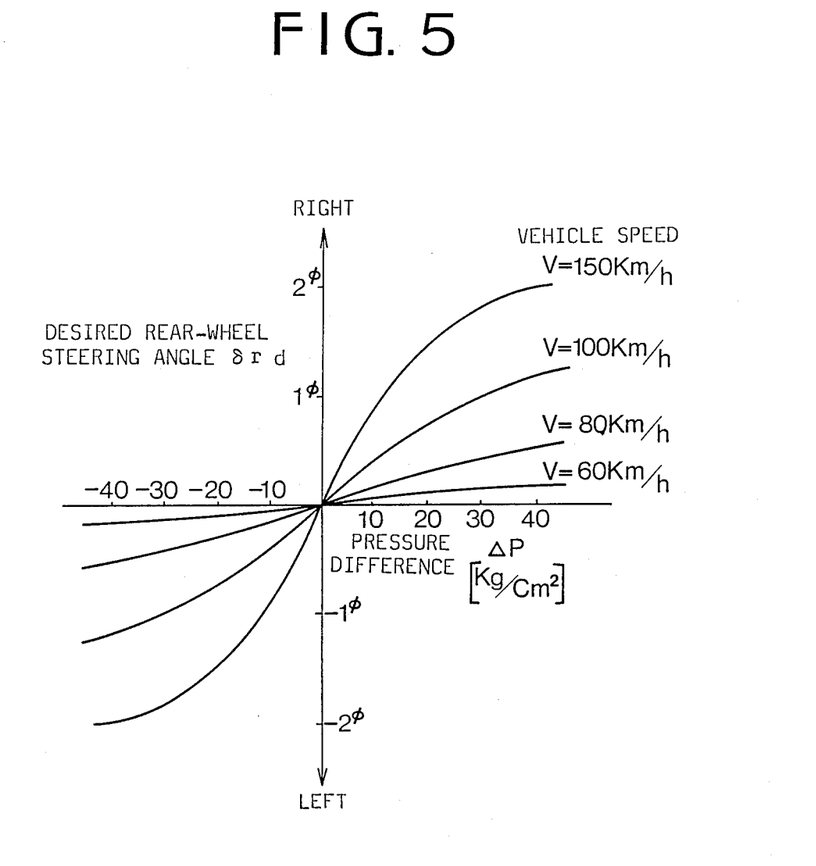
FIG. 5 is a graph showing a characteristic of a desired rear-wheel steering angle.

A desired rear-wheel steering angle $\delta rd$ is determined in accordance with the pressure difference $\Delta P$ and with vehicle speed V, detected by the vehicle speed sensor 15, as a parameter as shown in a graph of FIG. 5. When the vehicle speed exceeds 60 km/h, the desired rear wheel steering angle increases as a monotone increasing function of the difference $\Delta P$ and the vehicle speed V.

Figure 6:
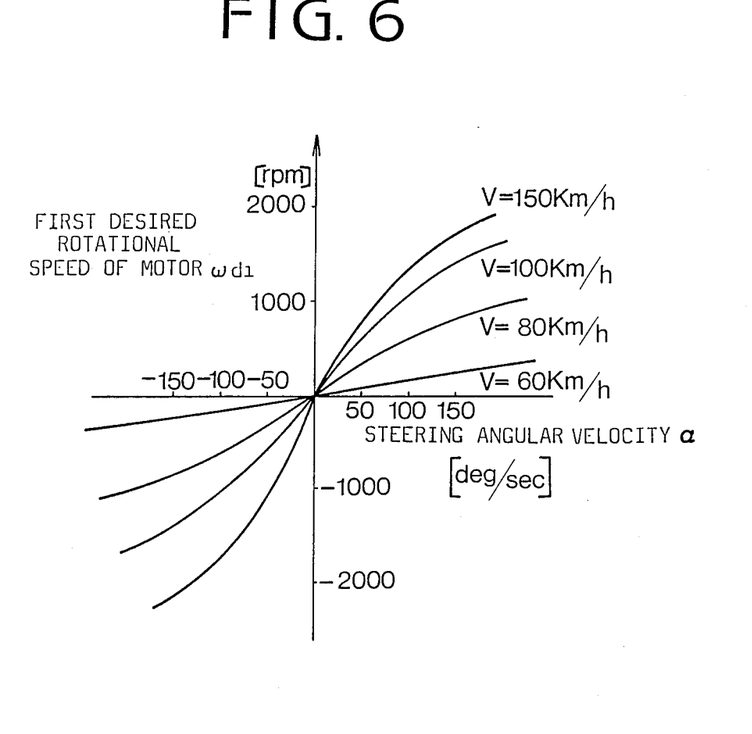
FIGS. 6 and 7 are graphs showing characteristics of a first and a second desired rotational speeds of a motor for steering rear wheels, respectively.

On the other hand, a filtered value of steering angular velocity signal ALP1 and vehicle speed V are used for determining a first desired rotational velocity $\omega d1$ for the motor 16, representing the rotational direction and the desired speed thereof, a shown in a graph of FIG. 6. The first desired rotational speed $\omega d1$ increases as a monotone increasing function of the angular velocity $\alpha$ and the vehicle speed V. Thus, when the steering wheel is quickly turned, the rear wheels are quickly steered accordingly.

Figure 7:
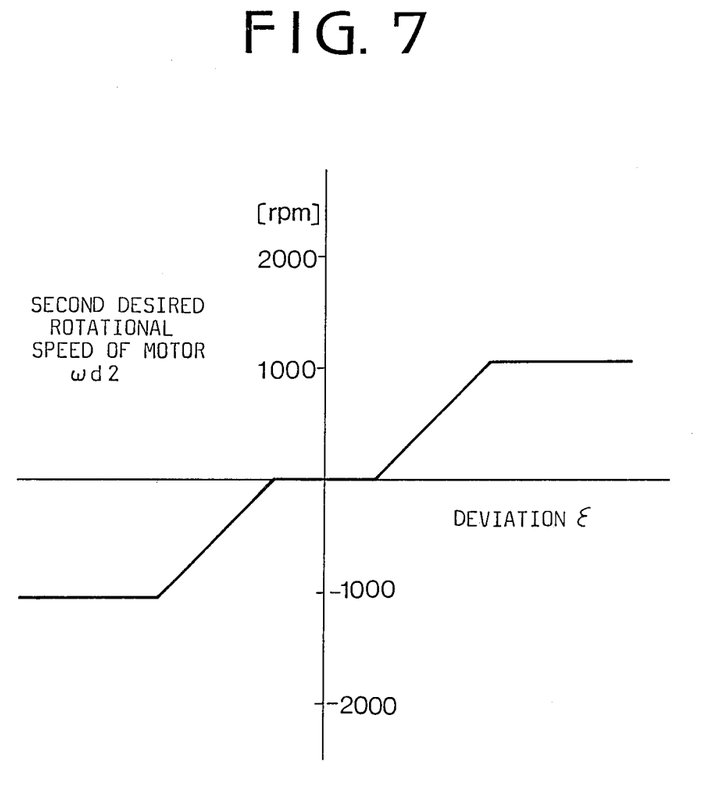

An actual rear-wheel steering angle $\delta r$ is detected by the angle sensor 26 and fed to the control unit 13 for determining a second desired rotational velocity $\omega d2$ for the motor. The second desired rotational speed $\omega d2$ is determined in dependence on a deviation $\epsilon$ of actual angle $\delta r$ from the desired angle $\delta rd$ ($\epsilon = \delta rd - \delta r$) as shown in FIG. 7, in order that the deviation $\epsilon$ may be decreased. A desired rotational velocity $\omega d$ for the motor is obtained by adding the first and second desired speeds $\omega d1$ and $\omega d2$ together.

On the other hand, an actual rotational velocity of the motor 16 is detected by the sensor 27. A deviation $\xi$ of the actual velocity $\omega$ from the desired velocity $\omega d$ is calculated in the control unit 13, and a signal dependent on the deviation is applied to the motor 16 to drive it.

The operation of the rear-wheel steering system of the present invention will be described hereinafter. When an engine for driving the vehicle is started, the hydraulic pump 7 is driven to pump up the actuating oil in the reservoir tank 8. The oil circulates from the pump 7 to the reservoir tank 8 through the control valve 2. At the same time, a coil of the clutch 17 is energized to engage the clutch, thereby enabling the steering operation of the rear wheels by the motor 16.

During the driving of the vehicle, when the steering wheel 1 is not turned, the control valve is at a neutral position, so that hydraulic pressures in the right and left chambers 9a and 9b of the power cylinder 9 are balanced. Thus, assist force does not generate. Accordingly, the pressure difference $\Delta P$ between pressures sensed by sensors 11a and 11b is zero. The calculating and amplifying device 16 feeds a zero signal to the control unit 13. Since the steering wheel 1 is not turned, the angular velocity $\alpha$ is also zero. Therefore, the desired rear wheel steering angle $\delta rd$ and desired motor rotational velocity $\omega d$ for the motor 16 are zero. Accordingly, if the rear wheels are deviated from the neutral position by a disturbing force, the system operates to steer the wheels to the neutral position in accordance with the desired rear-wheel steering angle $\delta rd$.

At cornering, for example to the right in a high vehicle speed range, the control valve 2 is operated to apply the actuating oil to the left chamber 9b and to discharge the oil in the right chamber 9a. Accordingly, assist force is generated in the chamber 9b thereby reducing the steering effort. At that time, the left pressure sensor 11b detects the assist pressure in the chamber 9b and the right pressure sensor 11a detects a return pressure (about 2 to 3 kgf/cm$^2$) in the chamber 9a, and the sensors 11a and 11b produce output signals representing the pressures, respectively. The difference $\Delta P$ between the pressures calculated at the calculating and amplifying device 12 is applied to the control unit 13. The desired rotational velocity $\omega d$ is obtained in dependence of the difference $\Delta P$, angular velocity $\alpha$, deviation and the vehicle speed V thereby driving the motor 16 in the rear-wheel steering system. Thus, the rear wheels are steered in the same direction as the front wheels. If the steering wheel is quickly rotated, a large first desired rotational velocity $\omega d1$ is generated, so that the rear wheels are steered at a high speed.

If the vehicle is subjected to a disturbing force generated by a gust of wind, for example, and the vehicle body is swayed, a cornering force generates on the front wheels, which is detected by the difference $\Delta P$ between pressures in the chambers $9a$ and $9b$. Therefore, the rear wheels 25 are steered in the same direction as the front wheels, thereby stabilizing the running of the vehicle.

When the vehicle is suddenly decelerated while making a turn at a high speed, even if the steering angle of the steering wheel is constant, the steering angle of the rear wheels is increased. Therefore, a tuck-in phenomenon, which is a phenomenon where the vehicle is suddenly oversteered, is prevented.

Figure 8A:
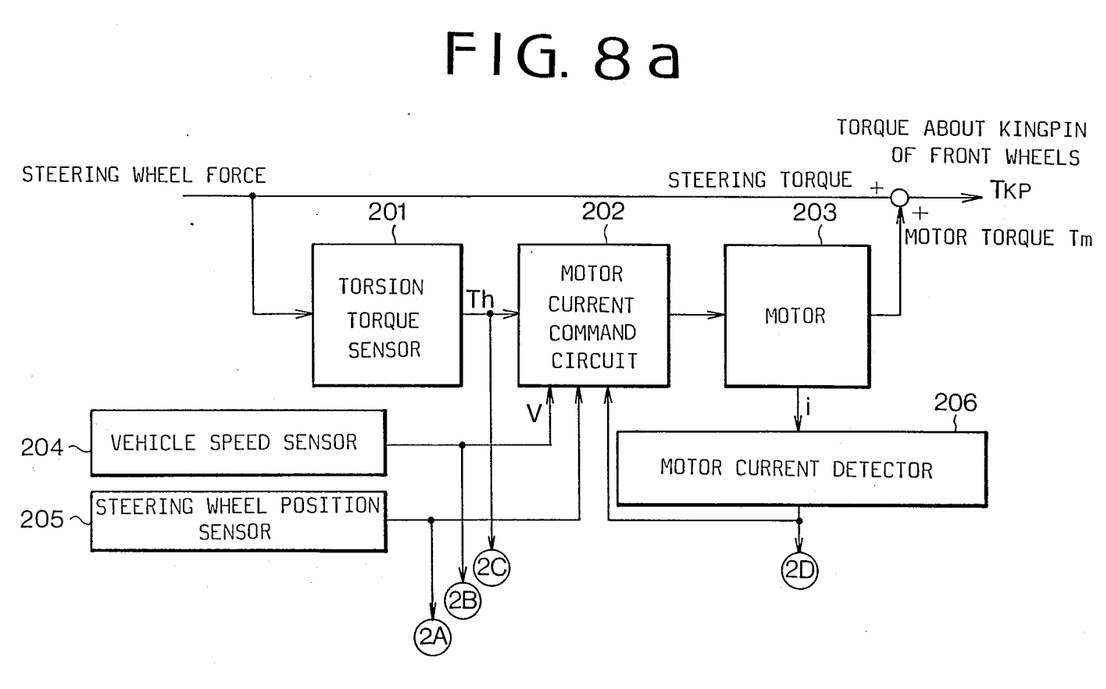
FIGS. 8a and 8b show a block diagram of a second embodiment of the present invention.
Figure 8B:
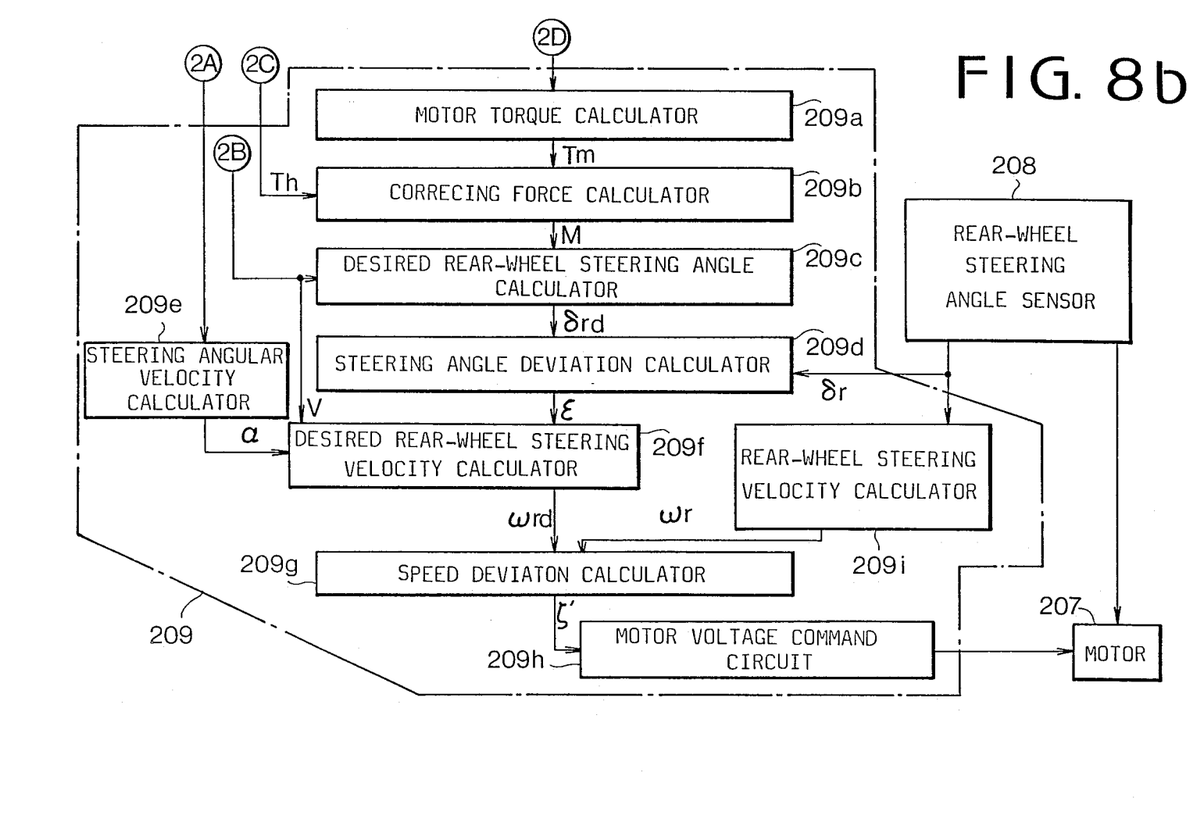

FIG. 8 shows a second embodiment of the steering system for the rear wheels applied to a motor vehicle having a known electric power steering system.

A torsion torque sensor 201 is provided, for example, on the steering shaft for detecting a torsion torque generated by a steering force applied to the steering wheel. A detected torsion torque Th is fed to a motor current command circuit 202 to which a vehicle speed V and a steering wheel angle detected by a steering wheel position sensor 205 are fed to calculate a motor current to be applied to a motor 203 for front wheels. Accordingly, the motor 203 is driven in dependence on the current. A motor torque Tm of the motor 203 is added to the torsion torque of the steering wheel so that a torque Tkp is produced about a kingpin of each front wheel, thereby reducing the steering effort. A motor current detector 206 is provided to detect the actual current i in the motor 203 for a feedback control.

A control unit 209 for the rear-wheel steering system has a motor torque calculator $209a$ which calculates a motor assist torque Tm in dependence on the actual current i in the motor 203. The assist torque Tm is supplied to a cornering force calculator $209b$ to which the torsion torque Th is applied to calculate an output signal M which corresponds to the cornering force exerted on the front wheels. A desired rear-wheel steering angle $\delta rd$ is obtained in dependence on the signal M and vehicle speed V in a desired rear-wheel steering angle calculator $209c$. An actual steering angle $\delta r$ of the rear wheels is detected by a rear-wheel steering angle sensor 208 and fed to a deviation calculator $209d$ to calculate a deviation $\epsilon$ of the actual steering angle $\delta r$ from the desired angle $\delta rd$.

The control unit 209 is further provided with a steering angular velocity calculator $209e$ which calculates the steering angular velocity $\alpha$ of the steering wheel from the steering angle detected by the sensor 205. A first desired rear-wheel steering angle $\omega rd1$ is obtained in accordance with the angular velocity $\alpha$ and the vehicle speed V in a desired rear-wheel steering angle calculator $209f$. A second desired steering angular velocity $\omega rd2$ is obtained in accordance with the deviation $\epsilon$ and added to the first desired steering angular velocity $\omega rd1$. Thus, a signal representing a desired steering angular velocity $\omega rd$ is applied to a motor 207 for steering the rear wheels through a motor voltage command circuit $209h$.

The actual steering angle $\delta r$ is further supplied to an actual steering angular velocity calculator $209i$ where an actual steering angular velocity $\omega r$ is calculated. The velocity $\omega r$ is fed to a speed deviation calculator $209g$. A deviation $\xi'$ of the actual velocity from the desired velocity is applied to the command circuit $209h$ for a feedback control.

The torsion torque signal from the sensor 201 and angular velocity signal from the sensor 205 in the present embodiments are rectified in the same manner as the pressure difference signal and the steering angular velocity signal in the first embodiment. Furthermore, the desired steering angle $\delta rd$ and the first and second desired angular velocity $\omega rd1$ and $\omega rd2$ are determined similar to the characteristics of the desired steering angle and desired rotational speeds of the motor shown in FIGS. 5 to 7. The motor 207 may be controlled by controlling the current instead of the voltage.

The present invention can be also applied to a vehicle having a manual steering system. In such a case, a sensor such as a torsion torque sensor for detecting a steering force is provided. The cornering force and desired steering angle of the rear wheels are determined in dependence on the torsion torque and vehicle speed. Other constructions are provided in the same manner as the first and second embodiments, so that the same operation as the embodiments can be obtained.

Figure 1:
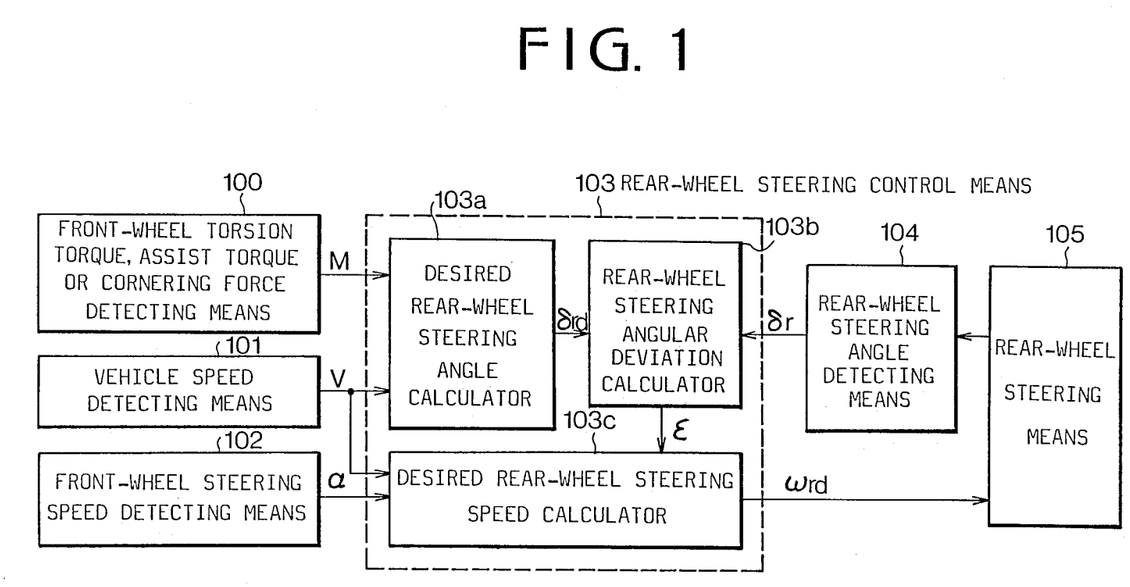
FIG. 1 is a block diagram showing a basic control according to the present invention.

The present invention is summarized as shown in a block diagram of FIG. 1. Means 100 is provided for detecting the torsion torque or the assist torque for steering front wheels, or the cornering force exerted on front wheels. An output signal M of the means 100 and a vehicle speed signal V from a vehicle speed detecting means 101 are applied to a desired rear-wheel steering angle calculator $103a$ of a rear-wheel steering control means 103 to obtain a desired rear-wheel steering angle $\delta rd$. An output signal $\alpha$ which is produced by a front-wheel steering speed detecting means 102 when the steering wheel is turned is rectified and fed to a desired rear-wheel steering speed calculator $103c$. A desired rear-wheel steering speed $\omega rd$ is obtained from the vehicle speed and the front-wheel steering speed. A rear-wheel steering means 105 comprising a motor is actuated to steer the rear wheels to the desired angle $\delta rd$ at a desired speed $\omega rd$. An actual rear-wheel steering angle $\delta r$ detected by a rear-wheel steering angle detecting means 104, is fed to a rear-wheel steering angle deviation calculator $103b$ which calculates a deviation $\epsilon$ representing a difference between the actual and desired angle, and applies the deviation to the desired steering speed calculator $103c$, thereby performing a feedback control.

From the foregoing, it will be understood that the present invention provides a system for steering rear wheels wherein an excessive delay of the steering the rear wheels is prevented so that the rear wheels are appropriately steered to stabilize the running of the vehicle.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A steering system for a motor vehicle having a front-wheel steering system including a steering wheel, comprising:

detector means for detecting force exerted on front wheels and for producing a force signal;

speed detector means for detecting rotational speed of the steering wheel and for producing a steering speed signal;

a vehicle speed sensor for producing a vehicle speed signal;

steering angle detecting means for detecting rear-wheel steering angle and for producing a steering angle signal;

calculator means responsive to the force signal and to the vehicle speed signal for producing a desired rear-wheel steering angle signal;

calculator means responsive to the steering speed signal and to the vehicle speed signal for producing a desired rear-wheel steering speed signal;

rear-wheel steering means responsive to the desired rear-wheel steering angle signal and to the desired rear-wheel steering speed signal for steering rear wheels.

2. The steering system according to claim 1 wherein the force exerted on the front wheels is a cornering force.

3. The steering system according to claim 1 wherein the force exerted on the front wheels is an assist torque applied to the steering wheel.

4. The steering system according to claim 1 wherein the force exerted on the front wheels is a steering force applied to the steering wheel.

5. The steering system according to claim 1 wherein the desired rear-wheel steering speed signal comprises a first desired speed signal dependent on the steering speed signal and a second desired speed signal dependent on deviation of the steering angle signal from the desired rear-wheel steering angle.

* * * * *